March 11, 1924.
B. R. ROBLIN
1,486,457
VEHICLE WHEEL
Filed May 29, 1922   2 Sheets-Sheet 1
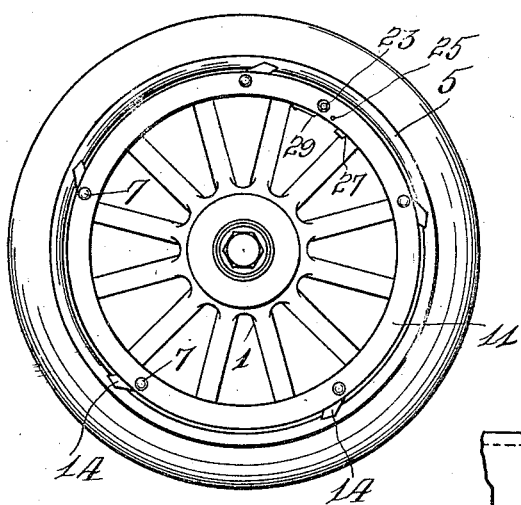
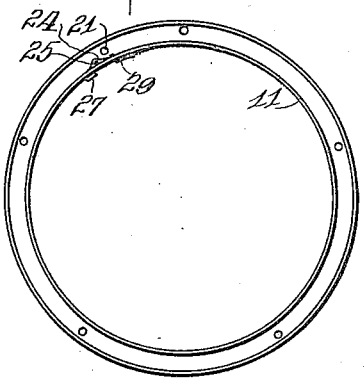
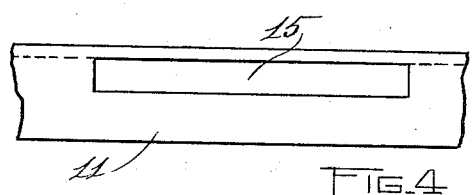
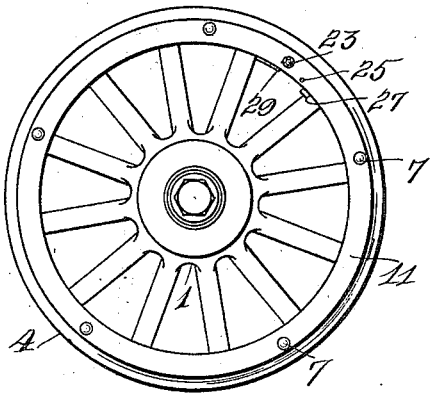
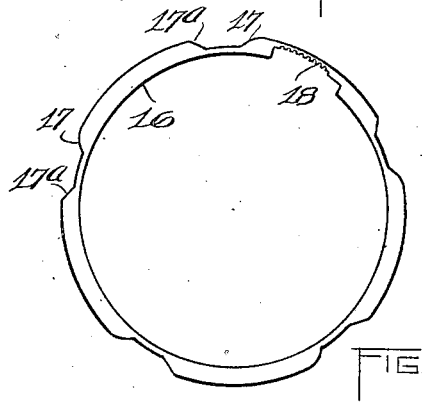
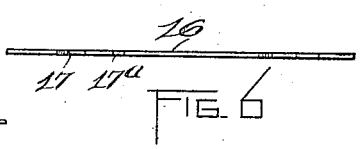
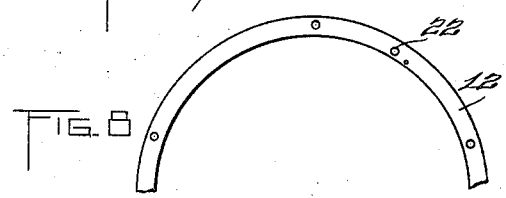
INVENTOR.
Brock R. Roblin
BY Davis + Simms
his ATTORNEYS.

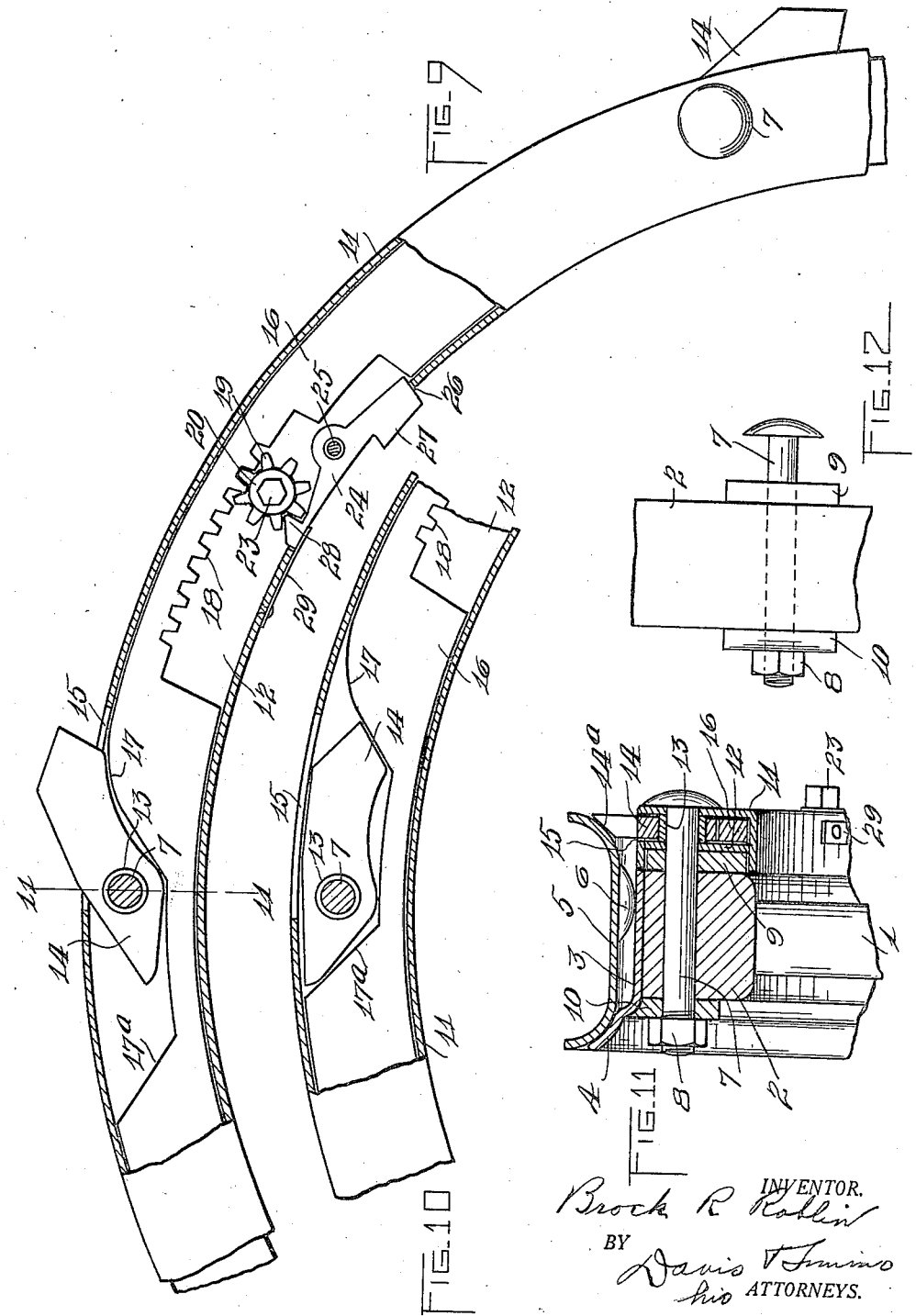

Patented Mar. 11, 1924.

1,486,457

UNITED STATES PATENT OFFICE.

BROCK R. ROBLIN, OF ROCHESTER, NEW YORK, ASSIGNOR TO LIGHTNING CHANGE AUTO WHEEL CORPORATION, OF ROCHESTER, NEW YORK, A CORPORATION OF NEW YORK.

VEHICLE WHEEL.

Application filed May 29, 1922. Serial No. 564,286.

*To all whom it may concern:*

Be it known that I, BROCK R. ROBLIN, a citizen of the United States, and resident of Rochester, in the county of Monroe and State of New York, have invented certain new and useful Improvements in Vehicle Wheels, of which the following is a specification.

The present invention relates to vehicle wheels and more particularly to the type having a fixed and a demountable rim and a locking mechanism for the rim of the type disclosed in my application for patent, Serial Number 455,383, filed March 25, 1921. An object of this invention is to provide an improved construction which will be less expensive to manufacture and more effective in action.

To these and other ends, the invention consists of certain parts and combinations of parts, all of which will be hereinafter described; the novel features being pointed out in the appended claims.

In the drawings:

Fig. 1 is a side view of a vehicle wheel embodying the present invention;

Fig. 2 shows the vehicle wheel with the pneumatic tire and demountable rim removed;

Fig. 3 is a view of the channelled annular or ring member forming part of the casing;

Fig. 4 is an enlarged fragmentary edge view of a portion of the channelled or ring member;

Fig. 5 is a plan view of the operating ring;

Fig. 6 is an edge view of the operating ring;

Fig. 7 is an edge view of the channel closing ring;

Fig. 8 is a fragmentary plan view of the channel closing ring;

Fig. 9 is a fragmentary view partially in section of the locking mechanism on a larger scale than that shown in Figs. 1 to 8 inclusive, the locking device being shown projected;

Fig. 10 is a fragmentary section similar to Fig. 9 showing one of the locking devices in retracted position;

Fig. 11 is a section on the line 11—11, Fig. 9 showing the locking device attached to a wheel; and Fig. 12 is a fragmentary view of the fixed rim showing one of the bolts employed for securing the locking mechanism in place.

Referring more particularly to the drawings, 1 indicates the wheel having a fixed wooden felly 2 on which a fixed rim 3 is fitted, this rim having an outwardly projecting flange 4 against which a channelled demountable rim 5 rests at one side, this channelled demountable rim having lugs 6 on the under side for engagement with the fixed metallic rim 3 at one side of the flange 4. This form of wheel is well-known and no claim per se is made thereto. The feature of this invention is the means by which the demountable rim 5 is removably secured on the fixed rim 3. In this instance, the locking mechanism utilizes bolts 7 which are passed through transverse openings in the felly 2, and secured on the inner side of the wheel by nuts 8, washers 9 and 10 being arranged on the bolts on the opposite sides of the felly 2.

The locking mechanism is supported on these bolts 7 within a casing formed, in this instance, by an annular or ring shaped member 11 which is provided on one side with a channel, the thickness of this ring shaped member being substantially that of the felly 2 and the channel side of this member being disposed toward said felly, so that the washers 9 may be received within the channel. Also fitting in the channel and acting as a closure for the latter to form another part of the casing is an annular plate 12, this plate also fitting on the bolts 7 and being spaced from the bottom of the channel by washers or bearing pieces 13 surrounding the bolts 7.

The locking devices are preferably in the form of dogs or detents 14 pivoted on the spacing bearing sleeves 13 which surround the bolts 7 and operable into and out of the casing, the casing for this purpose having the outer wall of its channel member provided at intervals with slots or openings 15 through which the dogs or detents 14 may be projected in order to engage with the adjacent side of the demountable rim 5, and the ends of the dogs being bevelled at 14ᵃ so as to enter into binding engagement with the sides of the demountable rim 5.

The operating mechanism for the dogs or detents 14, in this instance, is in the form of a ring 16 fitting in the channel member 11 between the bottom of the latter and the cover plate 12 and in the plane of the detents. This operating member is formed at intervals with notches, the walls of which cooperate with the detents to effect the projection and retraction of said detents through the openings 15. The notches are of such size as to receive the detents within them when such detents are retracted. The walls 17 and 17ª of these notches act as cams and cooperate with the detents 14 in such manner that when the operating ring 16 is moved in one direction, the detents will be projected and held in projected positions, whereas, when the operating ring is moved in the other direction, the detents will be retracted and held in retracted positions.

The operation of the operating ring 16 may be effected in any suitable manner. In this instance, the ring is provided in its inner periphery with a notch, one wall of which is provided with teeth 18. With these teeth a gear wheel 19 cooperates. This gear wheel has bearing projections 20 on opposite sides, journalled in an opening 21 in the bottom of the channel and an opening 22 in the closure ring 12. This gear wheel has a headed non-circular projection 23 projecting from one side thereof through the opening 21 and adapted to be engaged by a wrench or other tool for the purpose of shifting the operating ring 16.

With the end in view of securing the operating ring in its adjusted position, a detaining means is provided. This detaining means, in this instance, is in the form of a pivoted detent 24 pivoted at 25 on a shaft connecting the channel member 11 and the closure ring 12, this detent lying within a slot 26 in the inner wall of the channel member and having a portion 27 projecting through said slot for manual pressure in order to throw the nose portion 28 out of cooperation with the gear wheel 13 so as to permit the turning of said gear wheel. A spring 29 acts on this detent 24 for the purpose of maintaining this nose 28 in interlocking relation with the gear 19.

From the foregoing it will be seen that there has been provided an improved casing which would be effective for excluding dirt and dust from the operating part. This casing embodies a channel member opening to the felly of the wheel. In this channel member the locking devices and operating ring are mounted as well as the gear for turning the operating ring. The inner face of the channel member is closed by a closure member and this with the channel member is supported upon bolts passed through the felly of the wheel.

What I claim as my invention and desire to secure Letters Patent is:—

1. In combination with a vehicle wheel having a fixed rim and a demountable rim, a ring detachably supported on said wheel at one side of the fixed rim and having a channel in one side, the outer wall of the channel being provided with openings, locking devices mounted in the channel and adapted to be projected through said openings to cooperate with the demountable rim in order to hold the latter on the fixed rim and means operating in said channel for cooperating with the locking devices to effect their movement toward and from locking position.

2. In combination with a vehicle wheel having a fixed rim and a demountable rim, a ring detachably supported on said wheel at one side of the fixed rim and having a channel in one side, the outer wall of the channel being provided with openings, locking devices mounted in the channel and adapted to be projected through said openings to cooperate with the demountable rim in order to hold the latter on the fixed rim, and an operating ring mounted in the channel and turning on the innermost wall of the latter as a bearing to effect the movement of the locking devices toward and from locking position.

3. In combination with a vehicle wheel having a fixed rim and a demountable rim, a ring detachably supported on said wheel and having a channel in one side, the channel side facing toward the wheel and the outermost wall of the channel being provided with openings, locking devices mounted within the channel and adapted to be moved to and from locking position through the openings, and an operating ring for the locking devices mounted in the channel and turning on the innermost wall of the latter.

4. In combination with a vehicle wheel having a fixed rim and a demountable rim, a channel member having a channel face on one side disposed toward the fixed rim, bolts passing through the fixed rim and the channel member to hold the latter detachably to the fixed rim, a cover member arranged in the channel member and held by the bolts, bearings spacing the cover member for the bottom of the channel member, locking devices pivoted on said spacing bearings and operable through the openings in the outermost wall of the channel member to cooperate with the demountable rim in order to hold the latter on the fixed rim and means for operating said locking devices.

5. In combination with a felly, a fixed rim secured to the felly and provided with a flange at one side formed with a seat, a demountable rim adapted to slip sidewise over the fixed rim to cooperate with said seat on the flange, a member having a channel in one side disposed toward the felly, the outermost periphery of the channel member being flush with the fixed rim so as to permit the demountable rim to be slipped over said channel member onto the fixed rim, said flush face having openings extending therethrough into the channel of the channel member, locking devices mounted in said channel member adapted to be projected through said openings to engage the demountable rim and means for effecting the operation of said locking devices simultaneously toward and from locking position.

6. In combination with a vehicle wheel having a fixed rim and a demountable rim, two ring members supported by the wheel, locking devices pivotally mounted between said two rings and adapted to be moved toward and from positions between the rings, an operating ring arranged between the rings and having notches in which the locking devices are adapted to be received, the walls of said notches cooperating with said locking devices effecting the movement of the latter toward and from locking position, said operating ring also having a notch, one wall of which is formed with gear teeth and an operating gear for the ring supported between the two rings in the notch and cooperating with the gear teeth to effect the movement of the operating ring.

7. The combination with an annular member having a channel in one side face thereof, the outermost wall of the channel being provided with openings, of an operating ring mounted in the channel member and provided with notches, and locking devices mounted in the channel member adapted to be received within the notches of the operating ring and to cooperate with the walls of said notches to be moved toward and from locking position in the channel member.

BROCK R. ROBLIN.